No. 682,227. Patented Sept. 10, 1901.
J. PARKER.
VARIABLE SPEED MECHANISM.
(Application filed Aug. 29, 1900.)
(No Model.) 2 Sheets—Sheet 1.
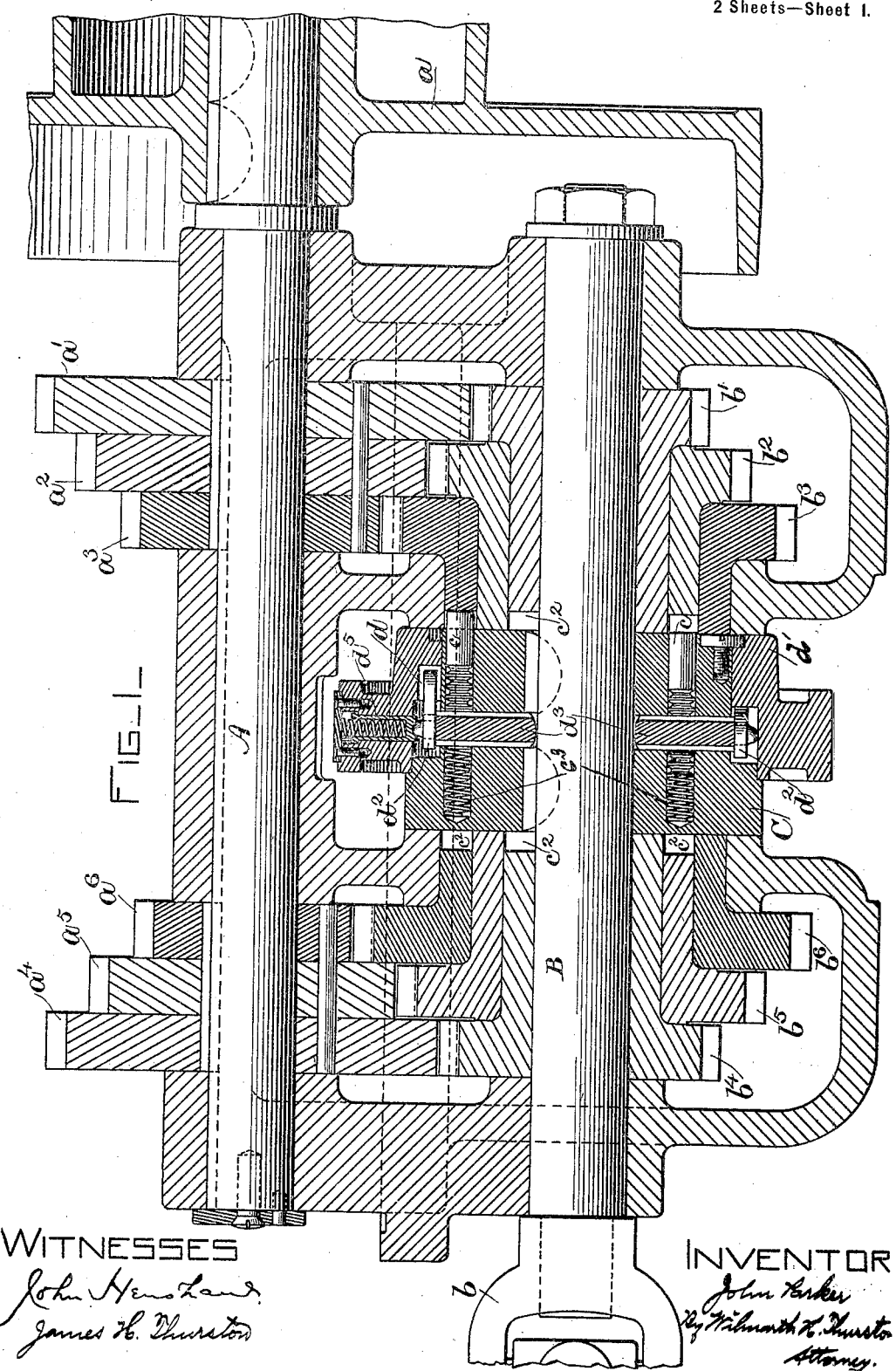
WITNESSES
INVENTOR

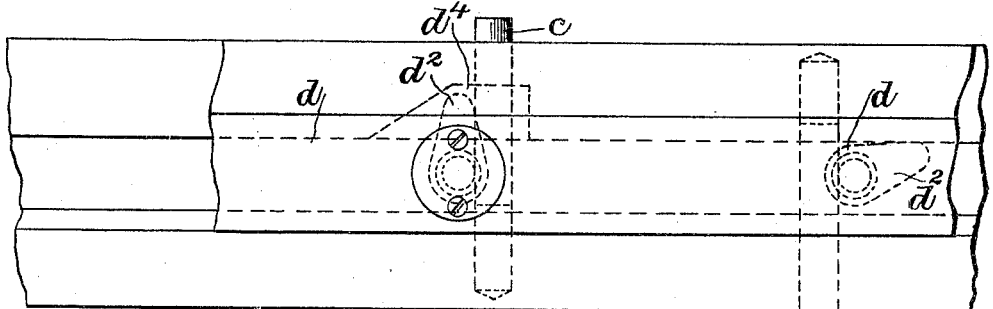
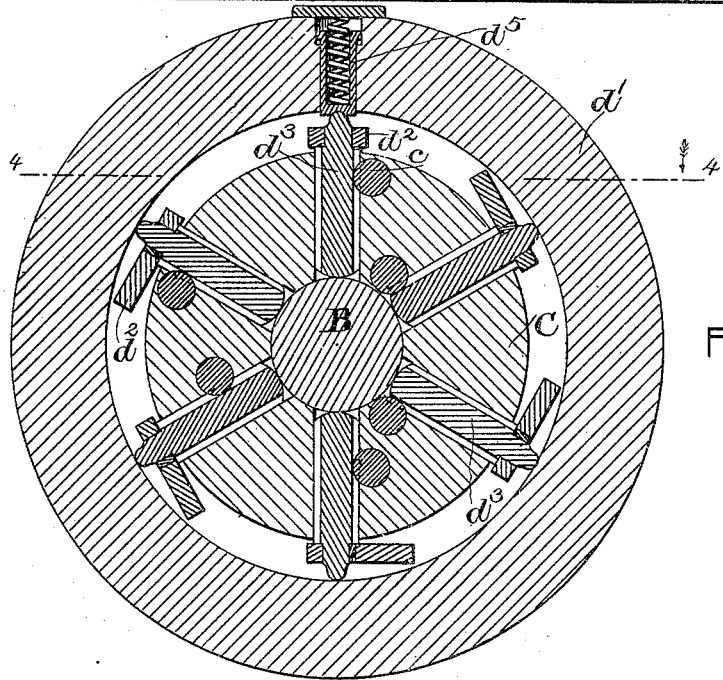
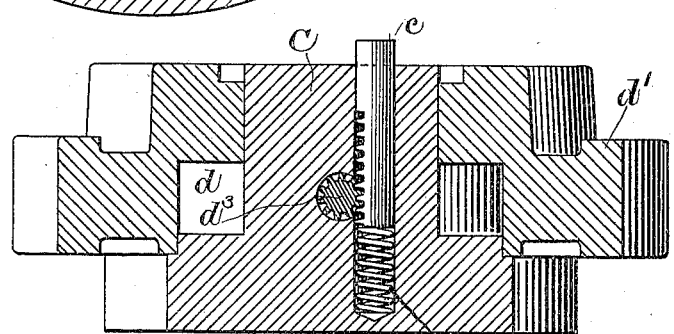

UNITED STATES PATENT OFFICE.

JOHN PARKER, OF PROVIDENCE, RHODE ISLAND, ASSIGNOR TO THE BROWN AND SHARPE MANUFACTURING COMPANY, OF SAME PLACE.

VARIABLE-SPEED MECHANISM.

SPECIFICATION forming part of Letters Patent No. 682,227, dated September 10, 1901.

Application filed August 29, 1900. Serial No. 28,432. (No model.)

*To all whom it may concern:*

Be it known that I, JOHN PARKER, of the city and county of Providence and State of Rhode Island, have invented a certain new and useful Variable-Speed Mechanism; and I do hereby declare the following specification, taken in connection with the accompanying drawings, forming a part of the same, to be a full, clear, and exact description thereof.

The invention relates to mechanism for effecting variations in speed and may be employed in various machines wherein it may be desired to vary the speed or relative movement of parts when using the machine under varying conditions.

By embodying the various features of the invention in a single structure a simple, compact, and efficient mechanism is provided for producing numerous variations in speed, and the changes from one speed to another may be quickly and conveniently effected without any danger of injury to the parts by reason of inaccurate adjustments. Such a structure comprises two series of gears of varying diameters arranged upon opposite sides of the devices for connecting any one of said gears to a shaft, which may be a driven or a driving shaft. The devices for connecting any one of the gears to the shaft comprise a ring secured to the shaft and carrying a series of bolts for engaging the loose gears which are controlled by a cam-sleeve mounted on the ring.

In the accompanying drawings, in which a mechanism is shown embodying all the features of invention in their preferred forms, Figure 1 is a longitudinal sectional view. Fig. 2 is a cross-sectional view through the connecting-ring and cam-sleeve. Fig. 3 is a view showing a development of the cam-sleeve; and Fig. 4 is a section on line 4 4, Fig. 2.

In the construction shown the mechanism embodying the various features of invention is employed for effecting variations in speed between a driving-shaft A and a driven shaft B, the devices for changing from one speed to another being mounted upon the driven shaft. The driving-shaft may be driven by means of a belt passing over a pulley $a$, secured thereto, and the driven shaft may be connected by means of a universal joint $b$ with any mechanism the speed of which it is desired to vary. The driving-shaft A carries two series of gears of varying diameters, the gears $a'$ $a^2$ $a^3$ forming one series and the gears $a^4$ $a^5$ $a^6$ forming the second series, and these gears engage two series of loose gears $b'$ $b^2$ $b^3$ and $b^4$ $b^5$ $b^6$, any one of which may be connected with the shaft B by means of devices located between said two series of loose gears. The gears of each loose series are preferably mounted to turn one upon the other, with the inner gear supported on the shaft B, since with the gears thus nested each gear may have a long bearing-surface without increasing the space occupied by the series, and the motion between the two engaging surfaces of two gears will be merely a differential motion, due to the difference in speed between the gears, thus more evenly distributing the wear and friction. The preferred means for connecting any one of the loose gears to the shaft B consists of a ring C, secured to the shaft B between the two series of gears and carrying a series of bolts $c$, arranged to engage recesses $c^2$, formed in the loose gears. The ends of the hubs of each series of loose gears are preferably located in the same plane and the recesses are preferably formed in the ends of the hubs, the bolts in such case extending parallel to the shaft B and being arranged in line with the hub of the gear with which it is to engage. The position of the bolts is controlled by a cam $d$, formed on a sleeve $d'$, mounted to turn on the ring C and connected with the bolts through a series of levers $d^2$, secured to the ends of pinions $d^3$, mounted in the ring C and engaging racks formed on the bolts. As shown, the cam $d$ is a face-cam, and the levers are held in engagement therewith by the action of springs $c^3$, which tend to force the bolts outward into the recesses in the loose gears. The cam $d$ is provided with a recess or depression $d^4$, into which the end of a lever $d^2$ may pass and allow the corresponding bolt to be engaged with the proper loose gear. The cam-sleeve may be held in position against accidental displacement with the depression $d^4$ opposite any lever by a spring-pin $d^5$, having a spherical recess in its end arranged to engage the ends of the pinion $d^3$, which are rounded for this purpose. With these devices for connecting the loose gears to the shaft it is impossible for more than one gear to be connected with the shaft at the same time, and any gear may be disconnected from the shaft and any other gear be quickly and conveniently connected thereto by merely turning the cam-sleeve into the proper position, which may be indicated by marks on the ring and sleeve, if desired. This means of connecting the loose gears to the shaft may be used with advantage with a single series of loose gears and is also a simple and efficient device for use in connection with two series of gears located upon opposite sides of the ring.

What I claim as my invention, and desire to secure by Letters Patent, is—

1. A variable-speed mechanism comprising a shaft, two series of gears of varying diameters, and devices between said two series of gears for connecting any one of the said gears to said shaft.

2. A variable-speed mechanism comprising a shaft, two series of nested gears of varying diameters, a ring secured to said shaft between said series of gears, and a series of bolts carried by said ring for connecting said ring and any one of said gears.

3. A variable-speed mechanism comprising a shaft, a series of gears, a ring secured to the shaft, a series of connecting devices carried by said ring and arranged to connect any one of said series of gears with said ring, and means for operating said connecting devices.

4. A variable-speed mechanism comprising a shaft, a series of gears, a ring secured to the shaft, a series of bolts mounted in said ring and arranged to connect said gears with said ring, and a cam-sleeve mounted on said ring for controlling said bolts.

5. A variable-speed mechanism comprising a shaft, a series of gears, a ring secured to said shaft, a series of bolts mounted in said ring, a series of levers connected with said bolts, and a sleeve provided with a cam for engaging said levers.

6. A variable-speed mechanism comprising a shaft, a series of nested gears having recesses in the ends of the hubs, a ring secured to the shaft, spring-pressed bolts mounted in said ring in line with said hubs, racks on said bolts, pinions engaging said racks, levers secured to said pinions, a cam-sleeve mounted to turn on said ring, and a cam on said sleeve engaging said levers.

JOHN PARKER.

Witnesses:
JAMES H. THURSTON,
W. H. THURSTON.